Patented Apr. 11, 1950

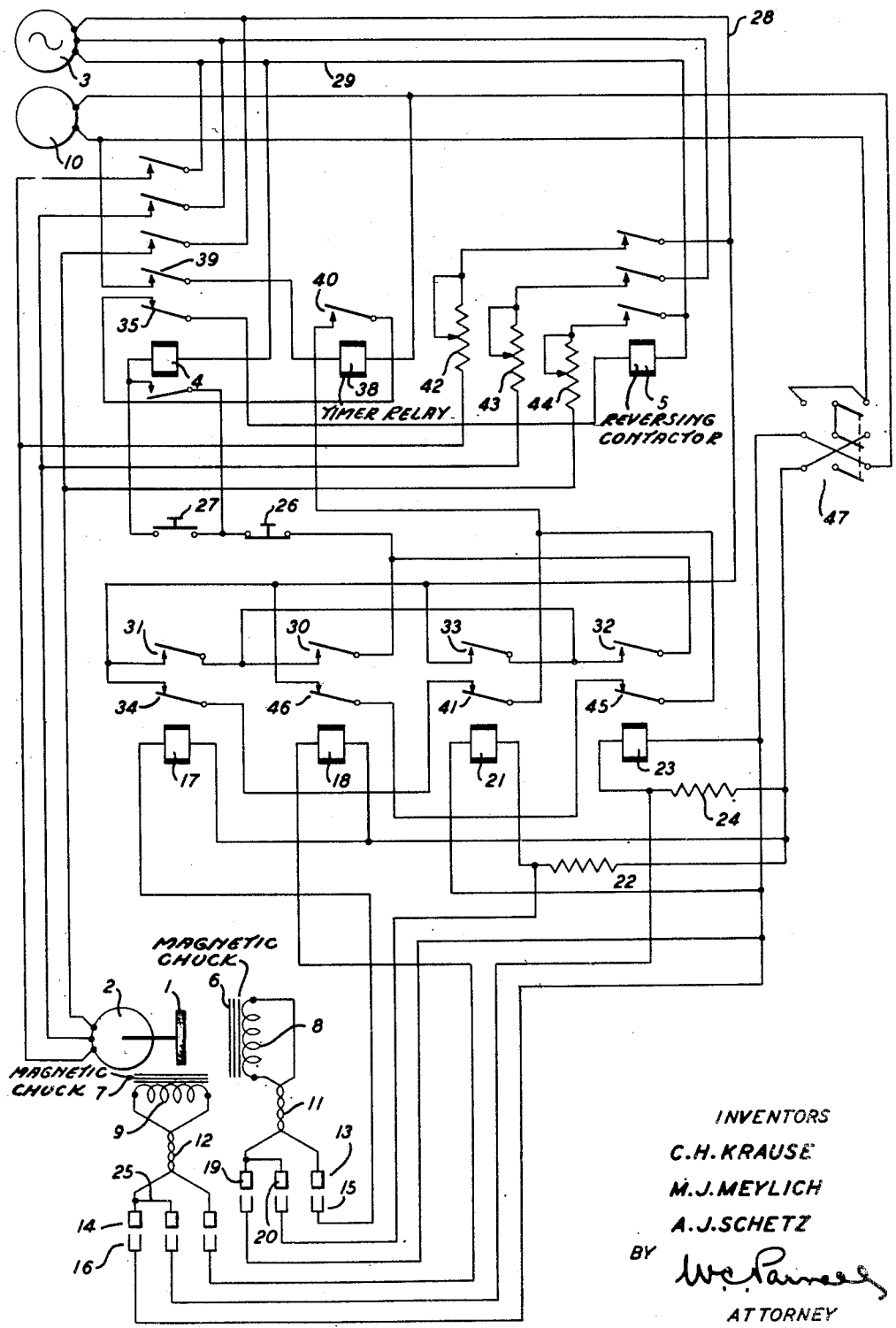

2,504,026

UNITED STATES PATENT OFFICE 2,504,026

SAFETY CONTROL SYSTEM

Carl H. Krause, Brooklyn, N. Y., and Milton J. Meylich, West Orange, and Alfred J. Schetz, Union, N. J., assignors to Western Electric Company, Incorporated, New York, N. Y., a corporation of New York Application November 28, 1947, Serial No. 788,422

11 Claims. (Cl. 51—2)

This invention relates to control system for machine tools, particularly those in which the work is held in proper position with respect to the tool by means of an electro-magnetic chuck.

In machines of this type the chucks are usually in the form of detachable surface plates having embodied therein one or more electromagnets which may be energized at will from a direct current source. With the magnetizing circuit open the chuck has very little holding power and the operator may adjust the work readily until exactly the desired position is obtained, and this adjustment is then maintained merely by closing the magnetizing circuit. The proper support of odd shaped pieces of work often requires the use of additional blocks and spacers and these are usually of magnetic material so that they also will be held in place upon magnetization of the chuck.

While this type of chuck is useful in connection with machine tools of various kinds, it frequently is used with so-called surface grinders, and as its application to a grinder is well adapted to illustrate the operation and advantages of the present invention, it will be described for purposes of illustration with respect to this type of machine. In such a grinder the work, held in place by the chuck, is usually oscillated by a carriage back and forth with respect to a grinding wheel rotating at high speed. In the grinding operation the wheel exerts considerable lateral thrust on the work and, in the event of a failure of the holding power of the chuck while the machine is operating, the work, together with any additional blocks and spacers, may be thrown from the machine with sufficient force to cause serious injury to personnel and damage to property.

An object of this invention is to eliminate this hazard in the use of electro-magnetic chucks.

In its broadest aspect, the invention consists in immediately detecting any failure of the magnetizing current being supplied to the chuck and rapidly reducing the momentum of the tool and hence the force available to throw the work. Upon failure of the magnetizing current the holding power of the chuck is not lost instantaneously but rather it decreases progressively to its final, residual value so that if the force applied to the work by the tool is reduced with sufficient rapidity, the chuck will continue to hold the work until its restraining power is no longer required. This result is obtained according to the invention by means immediately responsive to a failure of the chuck magnetizing current for disconnecting the tool drive motor from its normal source of power and applying reversing power to the motor for only a predetermined short time sufficient to bring the tool to rest, or to a safe low speed, before the chuck has lost its effective holding power.

In the following description the expressions "normally open" and "normally closed" relay contacts refer to the condition of the contacts when the relay is not operated.

In one embodiment of the invention a relay in series with the chuck energizing circuit has normally open contacts in the circuit controlling the application of driving power to the motor and normally closed contacts in the circuit controlling the application of reverse power to the motor, so that the tool may be driven in its operating direction only so long as the chuck is energized, and reversing power may be applied only when the motor has been disconnected from its normal source of power. The circuit controlling the application of reversing power also extends through contacts closed when the normal motor driving circuit is closed, and opened by timing means after the interval required to apply the desired braking action to the tool.

In some cases two or more magnetic chucks are used on the same machine as, for example, when a second or auxiliary chuck is held in place by a main chuck and in turn applies a holding force to certain parts of the work. In any such case, the protective features described above may be extended to cover the added chuck.

These and other features of the invention will be clearly understood from the following detailed description and the single figure of the drawing which shows the invention applied to a surface grinder having two electro-magnetic chucks.

Referring now to the drawing, the tool 1, in this case the grinding wheel of a conventional grinding machine, is driven by an induction motor 2 energized to run in a normal operating direction from a source 3 of three phase alternating current. For normal operation power is applied to the motor by a forward contactor 4 but when desired, the motor may be rapidly brought to rest by reverse phase power applied through a reversing contactor 5, as described in detail below. The chucks 6 and 7 for holding the work in operative relation to the tool 1 have magnetizing windings 8 and 9 which may be connected to a suitable source 10 of direct current by means of cords 11 and 12, terminating in plugs 13 and 14, for insertion in receptacles 15 and 16. When the plugs are in their receptacles, the current which magnetizes the chuck 6, operates the contactor 17 and the current through the chuck 7 operates the contactor 18. It will be noted that the contacts 19 and 20 of the plug 13 are conductively connected together so as to short circuit the operating coil of a relay 21 when the chuck 6 is magnetized. Conversely, when the plug is removed from its receptacle, the relay 21 is operated by current from the source 10 through a suitable resistor 22. Similarly, relay 23 is operated by current through resistor 24, but is restored to unoperated condition by the short circuiting connection 25 when the plug 14 is inserted in the receptacle 16 to magnetize the chuck 7.

The motor 2 is controlled in the usual manner by a normally closed stop switch 26 and a normally open start switch 27, serially connected with the operating winding of the contactor 4 to the conductors 28 and 29 of the motor supply, as explained in detail below. For the sake of clarity, the usual overload relays, indicator lamps, etc., have been omitted as a showing of these conventional features is not necessary to an understanding of the present invention.

Assume first that only the chuck 6 is being used and that plug 13 has been inserted in the receptacle 15 to hold a work piece in adjusted position on the chuck. Under this condition, with cord 12 disconnected, relays 18 and 21 will be released, but relays 17 and 23 will be operated. Upon the closing of the start switch 27, the motor contactor 4 will be operated over a circuit extending from conductor 28 through contacts 31 of relay 17, contacts 32 of relay 23, the switches 26 and 27 and the winding of the contactor 4 to conductor 29 to drive the tool 1 which performs its work in the usual manner until the motor 2 is stopped by the operation of the stop switch 26.

Similarly, if only the chuck 7 is to be used, the plug 13 will remain disconnected but the plug 14 will be inserted in receptacle 16, in which case the relays 18 and 21 will be operated and relays 17 and 23 will be released. The starting circuit for the motor contactor 4 then extends from conductor 28 to the start switch 27 through the contacts 33 of relay 21 and the contacts 30 of the relay 18, and as before, the machine can be started in the usual manner.

While the machine is operating as just described, the chuck magnetizing current may be interrupted in any one of a number of ways. An open circuit may occur within the chuck magnetizing winding, in the connecting cord, between the plug and the receptacle contacts or in the leads between the receptacle and the source 10, or the source 10 itself may fail. In any of these contingencies, however, as the windings of relays 17 and 18 are directly in series with their respective chuck windings, a failure of magnetizing current from any cause immediately releases the previously energized relay. For example, with chuck 6 in use and chuck 7 disconnected, that is, with relays 17 and 23 operated and relays 18 and 21 released, a failure of current through the chuck will release relay 17, thereby opening contacts 31 to release the contactor 4 and disconnect the motor from the line and closing contacts 34 in the operating circuit of the reversing contactor 5.

The release of contactor 4 also closes its contacts 35 and as the timing relay 38 was energized through contacts 39 while contactor 4 was operated, and is of a well-known type which does not open its contacts 40 immediately upon the breaking of its operating circuit, the contactor 5 is operated over a circuit extending from conductor 28 through contact 34 of relay 17, contact 41 of relay 21, the timer contacts 40, contacts 35 of contactor 4, and the winding of contactor 5 to conductor 29.

The operation of contactor 5 applies power from the source 3 to the motor through adjustable voltage dropping resistors 42, 43, 44, and as the connections between the conductors 28 and 29 and the motor windings are now reversed, the motor tends to run in the reverse direction and is rapidly brought to rest. The timing relay 38 is so adjusted that after the very short interval required to bring the tool substantially to rest, the contacts 40 will open, thereby releasing contactor 5 and leaving the motor 2 in deenergized condition. It will be seen, therefore, that even though the carriage of the machine continues to oscillate the work with respect to the tool, there is no force available to throw the work from the machine.

On the other hand, if only chuck 7 is in use and chuck 6 is disconnected, that is, with relays 18 and 21 operated, and relays 17 and 18 released, the contactor 4 is held operated over a circuit extending from the switch 27 to conductor 28 through contacts 30 of relay 18 and contacts 33 of relay 21. A failure of chuck current will release relay 18, thereby breaking the contactor circuit at contacts 30 and disconnecting the motor from the line. In this case, the reversing contactor 5 is operated over a circuit extending from conductor 29 through the winding of the contactor 5, contacts 35 of contactor 4, contacts 40 of relay 38, contacts 45 of relay 23, and contacts 46 of relay 18 to conductor 28. Reversing power is therefore applied to the motor as in the previous case for an interval determined by the setting of relay 38.

When both chucks are in use, relays 17 and 18 are operated and relays 21 and 23 are released due to the short circuiting connections in the cords. In this case the circuit for energizing contactor 4 extends through contacts 30 and 31 of relays 18 and 17, respectively, and upon failure of either chuck, the corresponding relay will be released to cut off the power from the motor and the reversing contactor 5 is energized through contacts 35 and 40, 41 of relay 21, and 34 of relay 17, if chuck 6 has failed; or through contacts 35 and 40, 45 of relay 23, and 46 of relay 18, if chuck 7 has failed.

If residual magnetism interferes with locating the work on the chuck or removing it therefrom, the chucks are demagnetized in the usual manner by operating a reversing switch 47. In setting up work on the chuck it sometimes is desirable to operate the spindle motor without magnetizing either chuck so that work may be adjusted readily to the desired position on the chuck. At such times relays 17 and 18 will be released, but relays 21 and 23 will be operated and the start circuit extends from conductor 28 to the start switch 27, through contacts 33 and 32 of the operated relays. In the latter stages of the setting up operation one (or both) of the chucks is magnetized and final adjustment of the work is made as by tapping with a hammer, and as soon as the actual grinding operation has begun, the safety feature described above is fully operative.

When the chucks have different electrical characteristics, the series relays 17 and 18 may also have different characteristics in which case it becomes important to avoid connecting either plug to the wrong receptacle. For this purpose the plug and receptacle combinations are made non-interchangeable, either by using indexing receptacles or combinations of different designs.

It is to be understood that the circuit described is merely an illustrative example of the application of the principles of the invention and that it may be modified in various ways by those skilled in the art without departing from the spirit and scope of the invention.

What is claimed is:

1. In a control system for machine tools wherein work is held in operative relation to the tool by means of an electro-magnetic chuck, the combination with a motor for driving the tool, a source of power, a first contactor for connecting the motor to the source of power to drive the tool in a given direction, a second contactor for applying reversing power to the motor and operating circuits for the contactors, of a relay serially connected with the magnetizing winding of the chuck and having normally open contacts in the operating circuit of the first contactor and normally closed contacts in the operating circuit of the second contactor.

2. In a control system for machine tools wherein work is held in operative relation to the tool by means of two electro-magnetic chucks, the combination with a motor for driving the tool, a source of power, a first contactor for connecting the motor to the source of power to drive the tool in a given direction, a second contactor for applying reversing power to the motor and operating circuits for the contactors, of a relay for each chuck serially connected with the magnetizing winding of the chuck, each relay having normally open contacts in the operating circuit of the first contactor and normally closed contacts in the operating circuit of the second contactor.

3. In a control system for machine tools wherein work is held in operative relation to the tool by means of an electro-magnetic chuck, the combination with a motor for driving the tool, a source of power, a first contactor for connecting the motor to the source of power to drive the tool in a given direction, a second contactor for applying reversing power to the motor and operating circuits for the contactors, of a relay serially connected with the magnetizing winding of the chuck and having normally open contacts in the operating circuit of the first contactor and normally closed contacts in the operating circuit of the second contactor, a normally operated relay having normally open contacts in parallel with the normally open contacts of the serially connected relay and normally closed contacts in series with the normally closed contacts of the serially connected relay, and means effective when the chuck is energized to disable the normally operated relay.

4. In a control system for machine tools wherein work is held in operative relation to the tool by means of an electro-magnetic chuck, the combination with a motor for driving the tool, a source of power, a first contactor for connecting the motor to the source of power to drive the tool in a given direction, a second contactor for applying reversing power to the motor and operating circuits for the contactors, of a relay serially connected with the magnetizing winding of the chuck and having normally open contacts in the operating circuit of the first contactor and normally closed contacts in the operating circuit of the second contactor, contacts closed upon release of the first contactor and timing contacts closed when the first contactor is energized both serially connected in the operating circuit of the second contactor, and timing means effective a predetermined time after the release of the first contactor for opening the timing contacts.

5. In a control system for machine tools wherein work is held in operative relation to the tool by means of an electro-magnetic chuck, the combination with a motor for driving the tool, a source of power, a first contactor for connecting the motor to the source of power to drive the tool in a given direction, a second contactor for applying reversing power to the motor and operating circuits for the contactors, of a source of direct current for magnetizing the chuck, a relay energized by direct current from the source and having normally open contacts associated with the operating circuit of the first contactor and normally closed contacts associated with the operating circuit of the second contactor, means for connecting the magnetizing winding of the chuck to the direct current source and means effective upon making said connection for de-energizing the relay.

6. The combination with a tool, an electro-magnetic chuck for holding work to be engaged by the tool, a motor for driving the tool, a source of power, means for connecting the motor to the source to drive the tool in a given direction, and a magnetizing circuit for the chuck, of means responsive to a failure in the magnetizing circuit while the motor is running for disconnecting the motor from the source, means effective upon disconnection of the motor for supplying thereto power tending to reverse the rotation of the motor, and timing means effective after a predetermined interval for cutting off the reversing power.

7. In a control system for machine tools wherein work is held in operative relation to the tool by means of two electro-magnetic chucks, the combination with a motor for driving the tool, means including two operating circuits for selectively energizing the motor to drive the tool in either direction, and a source of direct current for the chucks, of a normally operated and a normally released relay for each chuck, each relay having contacts in both of the operating circuits, and means for connecting each chuck to the source and for releasing the normally operated relay and operating the normally released relay.

8. In a control system for machine tools wherein work is held in operative relation to the tool by means of an electro-magnetic chuck, means for driving the tool at high speed, a magnetizing circuit for the chuck, means responsive to a discontinuity in the magnetizing circuit for disabling the driving means and for applying to the tool driving means power tending to reverse the direction of the motion and thereby absorb the kinetic energy of the tool, means for adjusting the reversing power and means for timing the duration of its application to reduce the speed of the tool to a safe value before the chuck has lost its effective holding power.

9. In a control system for machine tools wherein work is held in operative relation to the tool by means of an electro-magnetic chuck, a motor for driving the tool, a source of power for the motor a circuit for controlling the application of power to drive the tool at high speed in a given direction, a magnetizing circuit for the chuck, means responsive to a discontinuity in the magnetizing circuit for disconnecting the driving power from the tool and applying reversing power thereto, and means effective a predetermined time after the driving power has been disconnected from the tool for interrupting the flow of reversing power.

10. In a control system for machine tools wherein the work is held in operative relation to the tool by means of an electro-magnetic chuck, means for applying force to drive the tool in a given direction, a circuit for supplying magnetizing current to the chuck, means in the circuit for detecting a failure of the magnetizing current, and means operated by the detecting means for applying a reversing force to the tool to rapidly reduce the momentum of the tool.

11. In a control system for machine tools wherein the work is held in operative relation to the tool by means of an electro-magnetic chuck, means for applying force to drive the tool in a given direction, a circuit for supplying magnetizing current to the chuck, a relay having an operating winding serially connected in the circuit and contacts operated upon a failure of the magnetizing current for reversing the direction of the force applied to the tool, and means responsive to the operation of the contacts for timing and terminating the application of the reversing force to bring the tool rapidly substantially to rest.

CARL H. KRAUSE.
MILTON J. MEYLICH.
ALFRED J. SCHETZ.

No references cited.